(12) United States Patent
Allera et al.

(10) Patent No.: US 10,980,195 B2
(45) Date of Patent: Apr. 20, 2021

(54) SUBSTRATE FOR HYDROPONIC OR SOILLESS CULTIVATION

(71) Applicants: Caterina Allera, Sanremo (IT); Enrico Masella, Sanremo (IT)

(72) Inventors: Caterina Allera, Sanremo (IT); Enrico Masella, Sanremo (IT)

( * ) Notice: Subject to any disclaimer, the term of this patent is extended or adjusted under 35 U.S.C. 154(b) by 223 days.

(21) Appl. No.: 16/090,089

(22) PCT Filed: Nov. 9, 2016

(86) PCT No.: PCT/IB2016/056753
§ 371 (c)(1),
(2) Date: Sep. 28, 2018

(87) PCT Pub. No.: WO2017/195009
PCT Pub. Date: Nov. 16, 2017

(65) Prior Publication Data
US 2019/0110412 A1    Apr. 18, 2019

(30) Foreign Application Priority Data
May 9, 2016    (CH) ..................................... 00600/16

(51) Int. Cl.
| | | |
|---|---|---|
| *A01G 24/35* | (2018.01) | |
| *A01G 24/00* | (2018.01) | |
| *A01G 24/40* | (2018.01) | |
| *A01G 24/48* | (2018.01) | |
| *A01G 24/18* | (2018.01) | |

(52) U.S. Cl.
CPC ............. *A01G 24/35* (2018.02); *A01G 24/00* (2018.02); *A01G 24/40* (2018.02); *A01G 24/18* (2018.02); *A01G 24/48* (2018.02)

(58) Field of Classification Search
CPC ........ A01G 24/00; A01G 24/10; A01G 24/18; A01G 24/20; A01G 24/30; A01G 24/40
See application file for complete search history.

(56) References Cited

U.S. PATENT DOCUMENTS

| | | | | |
|---|---|---|---|---|
| 4,118,891 A | * | 10/1978 | Kehl ...................... | A01G 24/44 47/59 R |
| 4,918,861 A | * | 4/1990 | Carpenter .............. | A01G 24/22 47/59 R |
| 5,759,929 A | * | 6/1998 | Ikezawa .................. | B32B 29/00 442/385 |
| 2016/0143227 A1 | * | 5/2016 | De Smet .............. | A01G 9/0291 47/65.8 |
| 2016/0219810 A1 | * | 8/2016 | Erkkila .................. | A01G 24/00 |
| 2019/0112450 A1 | * | 4/2019 | Ooba ..................... | A01G 24/48 |

* cited by examiner

*Primary Examiner* — Kristen C Hayes
(74) *Attorney, Agent, or Firm* — Eva Taksel

(57) ABSTRACT

This invention is related to a new substrate (6) for soilless cultivation consisting of a three-dimensional reticular structure which is elastically compressible, with empty cells bounded by threads made of polymer or any other material which are chemically inert, hydro-phobic or weakly hydrophilic. For example, the substrate which consists of a lattice made of threads in polyethylene (6) compressed into a container (4) equipped with an irrigation system (3) and with a support (2) where the plants have been inserted (5). The system is a closed cycle wherein the stored solution (1) is recirculated.

10 Claims, 2 Drawing Sheets

[Fig.1]
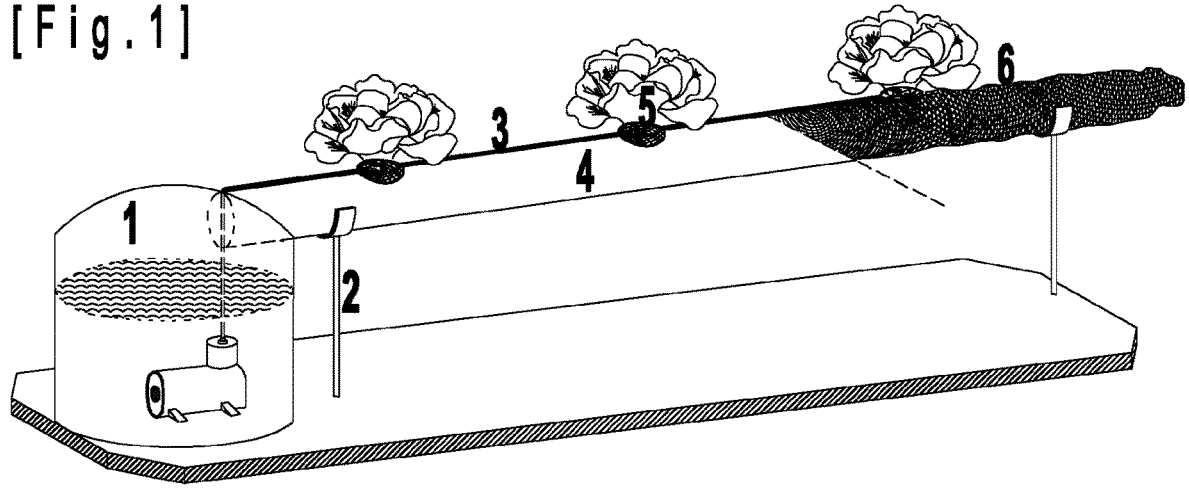
[Fig.2]
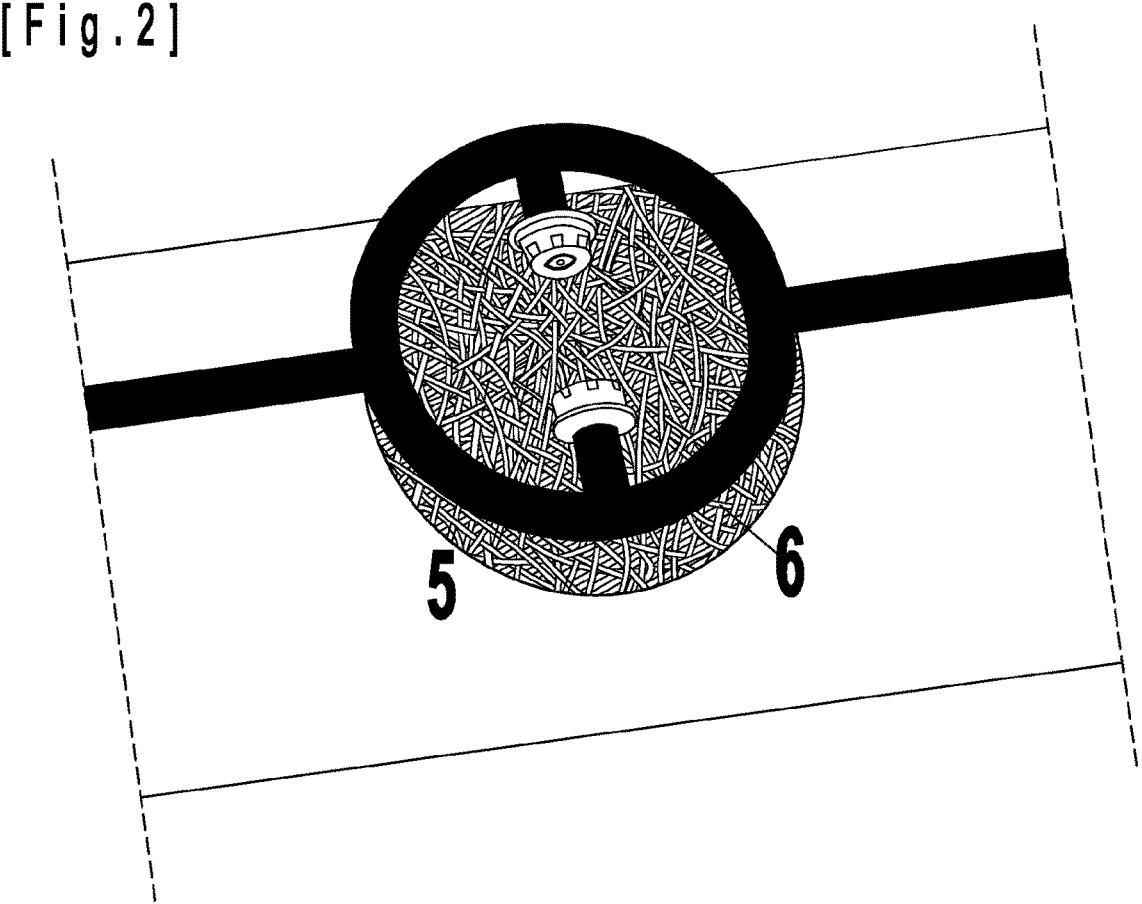

[Fig.3]
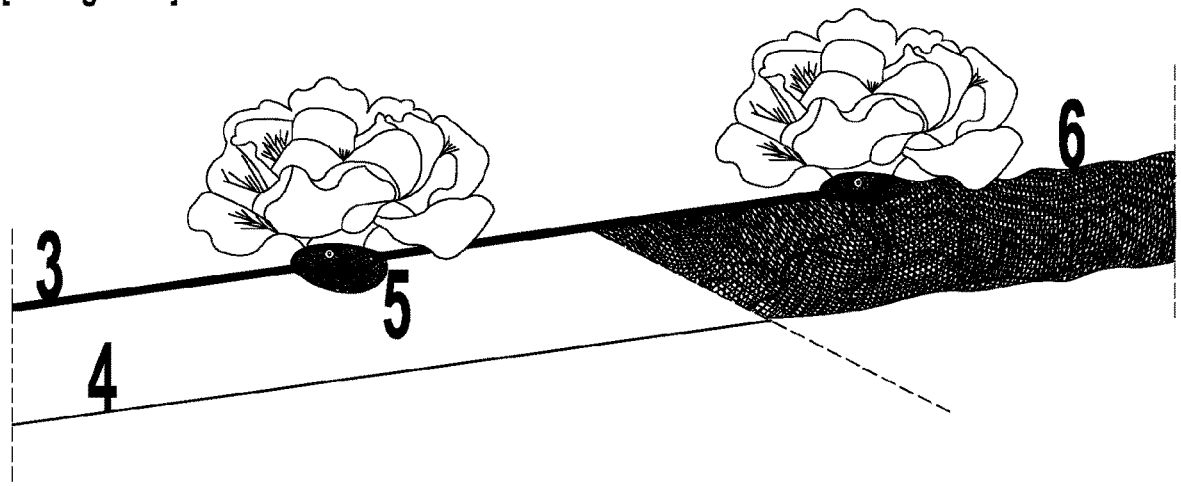
[Fig.4]
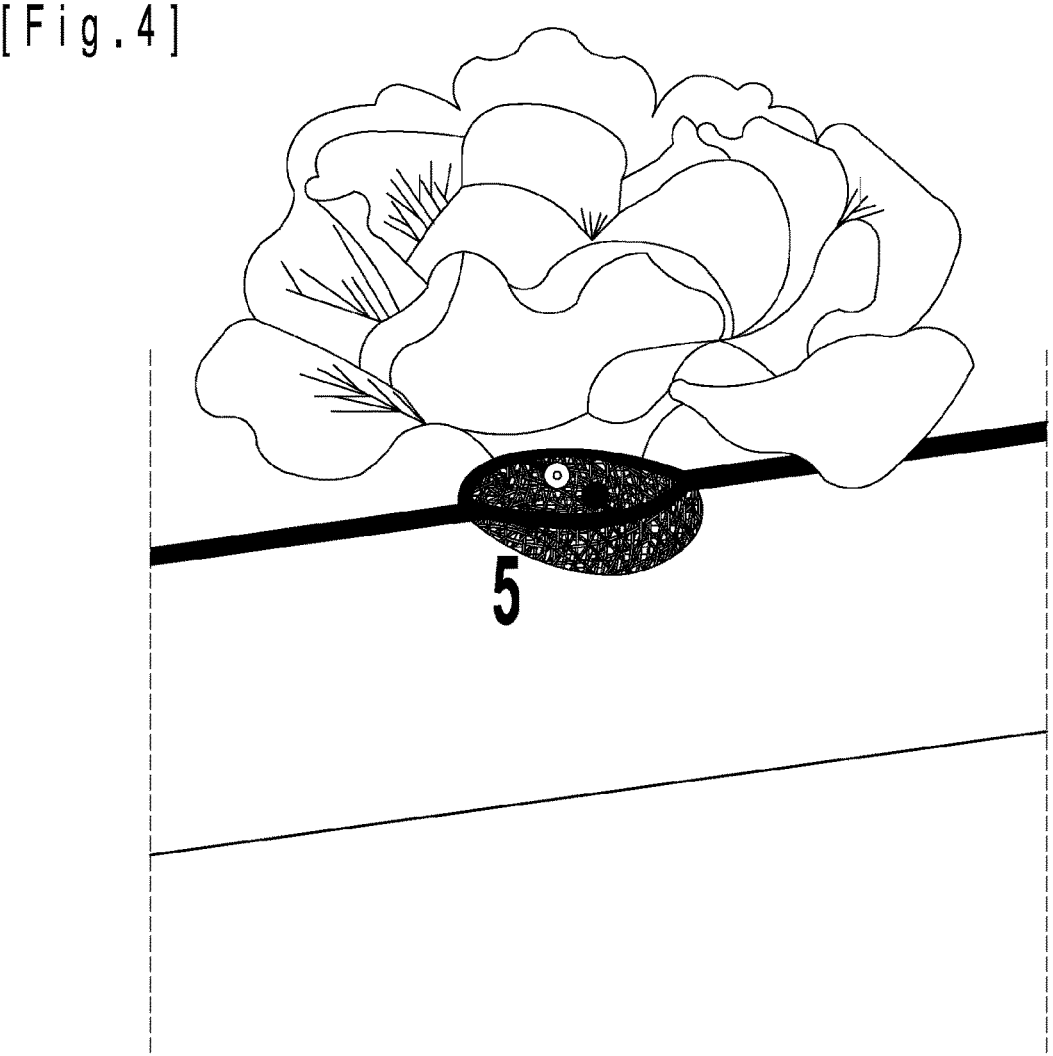

SUBSTRATE FOR HYDROPONIC OR SOILLESS CULTIVATION

TECHNICAL FIELD

This invention is related to a new substrate for hydroponics cultivation. Hydroponics or soilless cultivation is a technical method which enables development and growth of the plants without soil, using as substrate a medium, more or less inert, irrigated with a fertigation automatic system. The substrates used in well-established techniques are: natural ones, such as peat, bark, seaweed, straw, vegetable fibers, marcs, pressed plant fibers; inorganic ones, such as sand, volcanic lapilli, pumice, gravel, mineral wool, perlite, expanded clay, vermiculite; finally, those of synthesis, including polyurethane, polystyrene foam, urea foam, urea's copolymers.

BACKGROUND ART

All substrates of well-established use have problems and drawbacks that hinder and slow down the application of these technologies in common use. The disadvantages and problems of natural substrates, according to the type, consist in presenting high salinity, not neutral pH, risks of phytotoxicity, or being subject to degradation, limited resources, excessive water retention capacity with the risk of hypoxia radical, absorption of salinity and finally, for many of these substrates, it is not always possible their recycling. The disadvantages and problems of inorganic substrates, according to the type, are to have not neutral pH, low water retention, limited possibility for recycling, or being subjected to absorption of salinity, difficulty of disposal, or, as in the case of the rock wool, they may be harmful to the insiders. The disadvantages and problems of synthetic substrates, according to the type, are to have excessive lightness, weak anchoring of the roots and, often, absorption of salinity.

SUMMARY OF INVENTION

The purpose of the present invention is to provide a new substrate for soilless cultivation that has not the drawbacks of the classical substrates. This new substrate is simple to use, recyclable and usable in a wide range of crops, from edible plants, up to the bio-architecture. The innovative cultivation substrate is constituted by a three-dimensional reticular structure, elastically compressible, formed by empty cells bounded by threads made of polymers or others materials, which are chemically inert, hydrophobic or weakly hydrophilic and with low elastic modulus. For example this new substrate may be made of thin threads in polyethylene.

The main innovative aspect of the substrate is the water retention mode. In the present invention the substrate, which consists of hydrophobic or weakly hydrophilic threads, retains water by adhesion of the drops to the lattice of threads and for entrapment of water's meniscuses into the cells of the lattice due to surface tension. On the contrary, substrates commonly used, retain water for absorption of the material that constitutes them.

Technical Problems

The commonly used substrates are based on the principle of absorption of water to obtain a good water retention capacity. The problem is that together with the water, often are also absorbed the salts inside the substrate which tends to concentrate them. The absorbed salinity interacts with the nutrient solution of the subsequent irrigations, often altering the predetermined chemical balance. This problem is in general of great importance in the management of hydroponic cultivation because the high salinity also causes the increase of the osmotic pressure with damage to the crops. The high salinity also often determines the need to replace the nutrient solution during the cultivation cycle. In addition, at the cycle's end, the substrate may become unusable for subsequent cycles of cultivation due to the high salinity.

Solution to Problem

The innovation of the new substrate consists to have a good water retention capacity without absorbing salinity, thanks to the water captation which is held back by means of weak intermolecular attractive forces. In this case the salinity is not absorbed and concentrated in the substrate, but remain in solution inside the drops, captured by the same substrate, and the salinity of the solution varies only in relation to the demands of the plants grown. The multitude of hydrophobic or weakly hydrophilic threads, which form the substrate's lattice, develops a total area of captation which is given by the sum of the surface of each thread. Each thread holds the nutrient solution (water and salts), thanks to the weak intermolecular forces and it is supported by the others threads, around it, to hold a greater quantity of water, so that, more threads there are, greater is the water retained by the substrate.

Therefore, we can say that each thread multiplies the weak intermolecular forces of attraction of the water, which contains the salts, by the increase of the surfaces's number of adhesion, this gives to the reticular structure, on the whole, a good water retention, even in the presence of weak forces of attraction between the water of the solution and the molecular structure of the threads.

Therefore, in this substrate, the roots have to win only weak forces to absorb the water, so than it is all easily available to the plant. This is a big advantage compared to the others types of substrate: these others, in fact, have one part of water unusable because it is at a too low potential to be extracted from the absorbing of the roots.

Another interesting innovation of the substrate is the ability to modulate its water holding capacity so as to respect the typical physiological needs of the farmed species. In fact, you can increase or decrease the density of the substrate in the container simply increasing or decreasing its quantity per unit volume, so as to have a greater or lesser number of threads per cubic centimeter and, to have, consequently, a greater or lower water retention capacity. The reticular structure of the substrate also gives a high porosity.

For example with the said substrate made of a lattice consisting of cells bounded by crossed threads of polyethylene, compressed with an average density of 150 kg/mc, the porosity is higher than 85%. The threads are made of materials without porosity or with low internal porosity, so the porosity is only determined by the interspaces among the threads of the lattice.

Innovative aspect of the substrate is also the high anchorage which allows the development of the roots due to its lattice structure. The degree of compression of the lattice structure can also be varied according to requirements of consistency that the roots need of the different species. The elastic compression of the substrate and the low elastic modulus of the material that constitutes the threads of the lattice determine optimum conditions for the expansion and growth of the roots. The effective anchorage and the roots development, together with the lightness, and simplicity of management of the fertigation, also determine the conditions for an easy utilization in bio-architecture. If you operate, for example, in a closed-cycle system, another innovative aspect of the substrate is that the nutrient solution can be almost completely recovered at net of crop's need. This is possible because the substrate's absorption is absent and the evaporation is negligible because the substrate is inside a container. In this invention, on the contrary with NFT and SNFT systems, which have a high and similar water's saving, the fertigation is not continuous with an interesting saving energy.

Another innovative aspect of the substrate is the ability of self-regulation of the overwatering due to human error or malfunction of the irrigation system. Excessive watering can cause the root's hypoxia with plant's necrosis risking to lose the whole crop. In this invention, in conditions of excessive irrigation the drops, which are suspended to the lattice's threads and the water's meniscuses trapped inside the cells, would raise their mass and they would fall by gravity not allowing the increase of water held back.

Another innovative aspect is to change the substrate's density varying the degree of compression inside the container; this allows a variation of water retention capacity from plant to plant, even if the drippers provide the same water stream. In general, the optimal density, with which the substrates may be used, is between 120 and 180 kg/m$^3$, depending on the water requirements of the cultivated plant species.

Another innovative aspect of the substrate it is to be chemically inert, it doesn't interact with the nutrient solution and it doesn't change the pH of the nutrient solution. Another innovative aspect of the substrate is the durability that facilitates its utilization in bio-architecture, on the green walls and roofs, where the plant varieties are perennials.

Another innovative aspect of the substrate it is to be made with non-toxic and recyclable materials with antibacterial properties, for example in polyethylene. Therefore the advantages of the new substrate may be summarised as follows: lightweight; high porosity; good water retention capacity; almost no absorption of salinity; invariance of the solution pH; durability; non-toxic; antibacterial properties; no risk of root hypoxia in case of overwatering; recyclability; full availability of the water retention; flexibility thanks to the possibility to vary the density; simplicity of the system; easy to use in bio-architecture and for the implementation of small units to personal use; high water saving in a closed cycle farming systems.

BRIEF DESCRIPTION OF DRAWINGS

The features of the present invention are shown in one form of practical realization illustrated by way of example, not limitative, in the annexed drawings.

FIG. 1 shows the substrate (6) inserted in a container (4), suspended on a support (2), in which have been carried out some holes (5) to receive the plants irrigated by a dripper system (3) in closed cycle, wherein solution is collected in the container (1).

FIG. 2 shows a particular of the plant's housing (5) and the substrate's threads (6).

FIG. 3 a detail of the lattice structure of the substrate is enlarged (6).

FIG. 4 a particular of the housing (5) and grown plant is zoomed.

REALIZATION OF THE INVENTION

FIG. 1 shows an example of the invention: a lattice of threads made of polyethylene with a diameter of 0.25 mm was used (6) and compressed inside a pipe of 100 mm diameter (4), with a density of approximately 125 Kg/mc. A drip irrigation system, (3) with a dripper positioned close to each plant, had distributed a daytime fertigation of 400 ml, for each plant, every two hours and only once in the night with a quantity of 400 ml, for a total duration of operation of the circulation pump of 2 hours every 24 hours. The cultivation was, in the spring, outdoors under a shed. The temperatures were respectively 8° C. Min. and 22° C. Max. The pipe positioned on a support (2) was tilted to 2% to drain the recirculating solution collected in the container (1). The Gentilina salad was planted at the distance of 20 cm, each other, along the tube inside the holes of 10 cm diameter (5) after the cleaning the roots from the whole ground remained. The system was used in a closed cycle with a nutrient solution chosen according to the literature, that came periodically added and rebalanced in salinity and pH by adding nutrients. At the end of the cycle the salad was collected and the solution was stored and rebalanced for the next cycle.

The invention claimed is:

1. A system for soilless or for hydroponic cultivation, comprising
   a) a substrate comprising a three-dimensional reticular, elastically compressible, structure formed by empty cells bounded by threads made only of materials without porosity or low internal porosity, hydrophobic or weak hydrophilic and chemically inert, wherein the threads are made of thin threads of polyethylene having a diameter of 0.25 mm, and wherein the substrate is configured to retain water without absorption by adhesion of drops to a lattice of the threads due to the weak intermolecular forces and for entrapment into the cells of the lattice due to surface tension and further configured to not absorb almost any salinity;
   b) a container with holes in which the substrate is arranged; and
   c) a closed loop irrigation system.

2. The system according to claim 1, wherein the threads are made of polyethylene in which a porosity of said three-dimensional reticular structure is determined by interspaces among the threads of the lattice.

3. A system according to claim 1, wherein said polyethylene comprises compressed polyethylene.

4. A system according to claim 3, wherein said compressed polyethylene has an average density of 150 kg/m$^3$.

5. A system according to claim 3, wherein said three-dimensional reticular structure has a porosity greater than 85%.

6. A system according to claim 1, wherein said container is supported by a support on a slope.

7. A system according to claim 6, wherein said closed loop irrigation system comprises a drip irrigation system configured to deliver water to said substrate.

8. A system according to claim 7, wherein said closed loop irrigation system further comprises a receiving tank, configured to receive water from said substrate.

9. A system according to claim 8, wherein said closed loop irrigation system further comprises a pump for recirculating water from said receiving tank back to said substrate.

10. A system according to claim 1, wherein said substrate is suitable for receiving seeds, seedlings, plants or combinations thereof.

* * * * *